HIGH FREQUENCY ELECTRON DISCHARGE DEVICE

Original Filed Dec. 16, 1959 2 Sheets-Sheet 1

INVENTORS
Joseph K. Mann
by Wm. Nolan
Attorney

INVENTORS
Joseph K. Mann
Wm J. Nolan
Attorney 3,394,283

HIGH FREQUENCY ELECTRON DISCHARGE DEVICE

Joseph K. Mann, Palo Alto, Calif., assignor to Varian Associates, Palo Alto, Calif., a corporation of California Application June 18, 1962, Ser. No. 203,374, now Patent No. 3,309,631, dated Mar. 14, 1967, which is a division of application Ser. No. 859,964, Dec. 16, 1959, now Patent No. 3,058,026, dated Oct. 9, 1962. Divided and this application Nov. 25, 1966, Ser. No. 597,085
4 Claims. (Cl. 315—5.48)

ABSTRACT OF THE DISCLOSURE

A multi-cavity klystron tube employing a simplified modular construction in which the modules are the tuned cavities. The cavities, including flat circular end walls are first assembled and then two or more cavities are joined together by brazing the mating end walls together around their peripheries. Within each of the cavities is mounted a simplified tuner mechanism incorporating stops to limit the travel of the movable members.

This application is a divisional application of co-pending U.S. patent application, Ser. No. 203,374, now U.S. Patent 3,309,631 issued Mar. 14, 1967 filed June 18, 1962 which in turn is a divisional application of United States patent application Ser. No. 859,964 filed Dec. 16, 1959 now United States Patent No. 3,058,026 issued Oct. 9, 1962.

The present invention relates in general to high frequency tube apparatus, and, more specifically, to a novel high frequency, high power velocity modulation tube which is extremely useful for providing a continuous wave output at high average powers and which is easily tunable over a wide frequency range. Such tubes are especially useful as output tubes in tropospheric forward scatter communication link, and for transmitting tubes covering the UHF-TV band.

Heretofore multicavity klystron amplifiers have been built which would provide relatively high output powers on the order of one kw. average at S frequency band. These tubes suffered from short life and complexity.

The present invention provides a compact, rugged permanent magnet, air cooled, high power, multicavity klystron amplifier capable of delivering average output powers in the order of one or more kw. and at the same time have the greatly enhanced tuning range of approximately 40 percent and a gain of 50 db. The wide tuning range is obtained by the use of an improved tuning apparatus first disclosed in the co-pending application, Ser. No. 749,225, now U.S. Patent No. 2,994,009, invented by Robert C. Schmidt et al. and wherein both the inductive and the capacitive parameters are varied in a desired manner to tune the cavity.

The principal object of the present invention is to provide a novel high power, high gain amplifier tube apparatus having exceptionally wide frequency tuning range.

One feature of the present invention is the provision of a novel tuner actuator apparatus whereby the tuner means can easily be positioned and adjusted within the cavity as desired.

Another feature of the present invention is the provision of a novel high frequency tube assembly including a plurality of cavity resonators, each resonator having two spaced apart circular end walls and sidewalls therebetween, the end walls of successive resonators being joined together in a vacuum tight manner at their periphery whereby separate cavity resonators can be first separately assembled and then the desired number of separate assembled cavity resonators successively joined together.

Figures 1, 2:
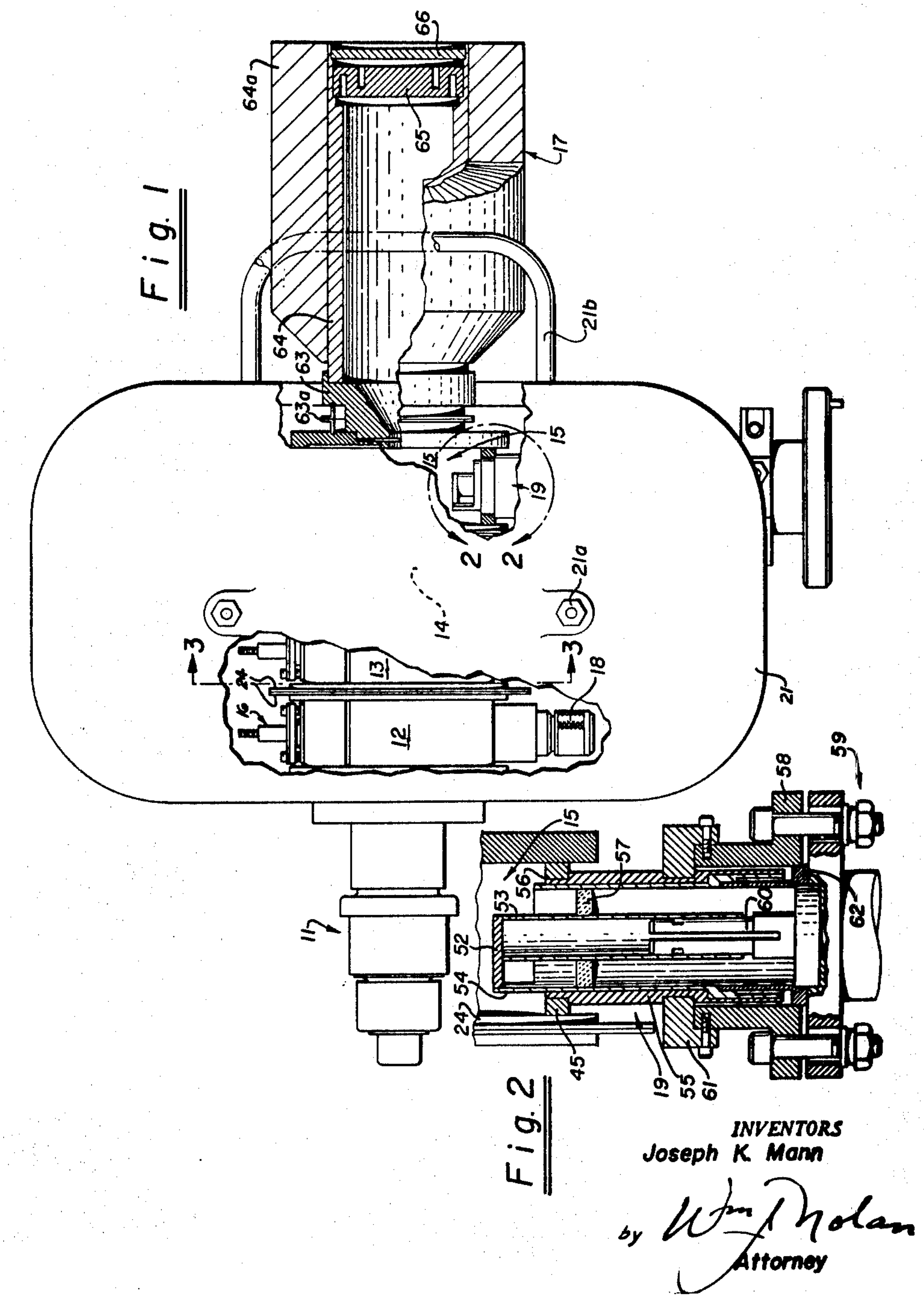
Figures 3, 4:
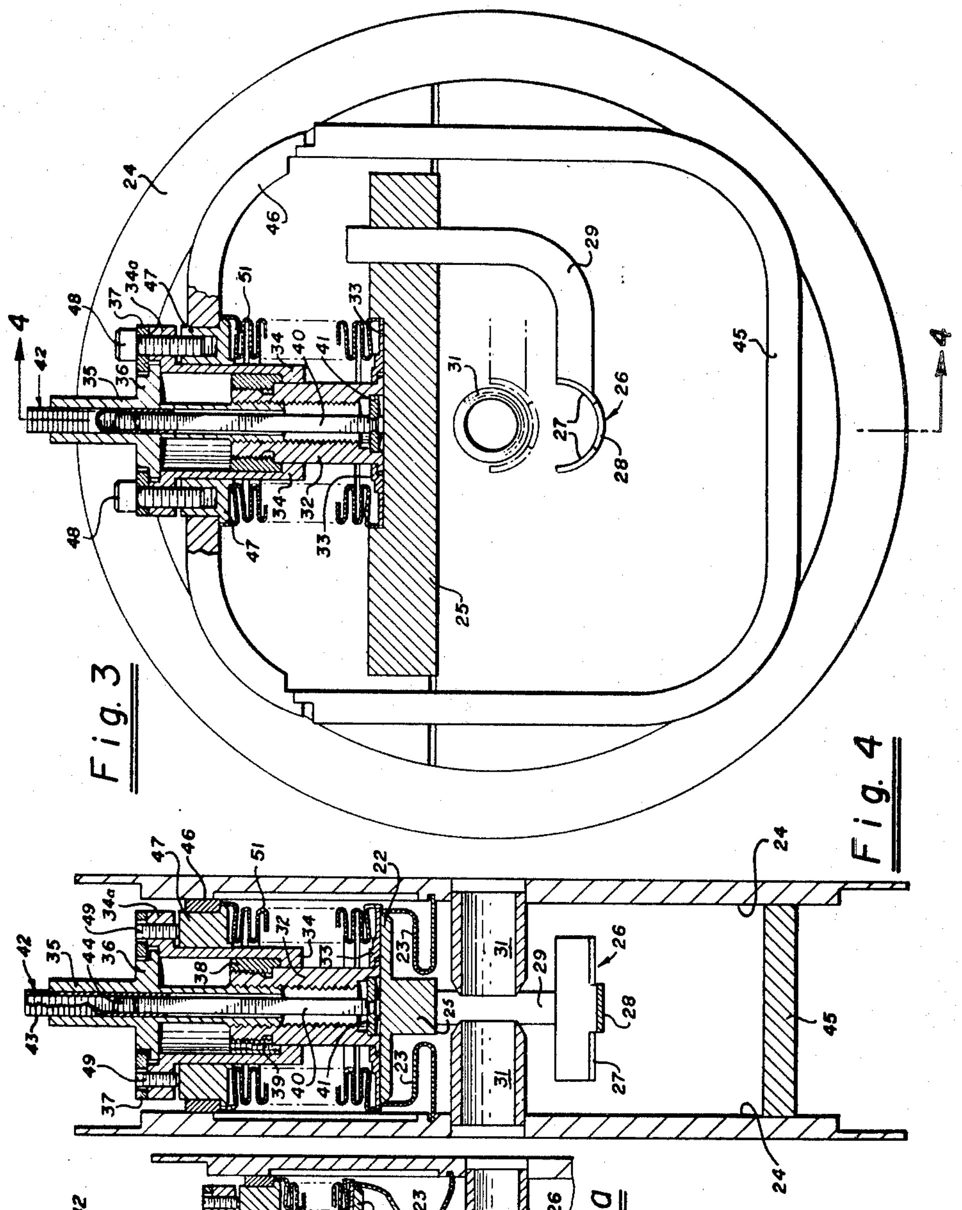
Figure 4A:
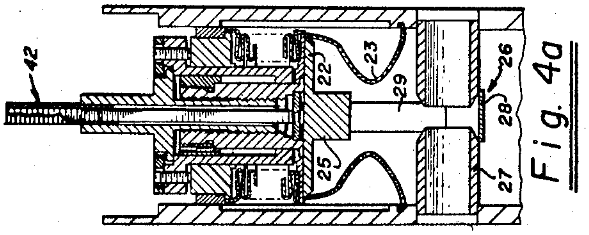

Other features and advantages of the present invention will become apparent upon a perusal of the following specification taken in connection with the accompanying drawings wherein, FIG. 1 is a partly cut away side elevational view of a novel high power klystron amplifier of the present invention, FIG. 2 is an enlarged detailed view of a portion of the structure of FIG. 1 delineated by line 2—2, FIG. 3 is an enlarged cross-section view of a portion of the structure of FIG. 1 taken along line 3—3 in the direction of the arrows with the tuning means shown in its most inward postion, FIG. 4 is a cross-section view of a portion of the structure of FIG. 3 taken along line 4—4 in the direction of the arrows, and FIG. 4*a* is a cross-section view of the tuner portion of the structure of FIG. 4 with the tuning means shown in its most outward position.

Referring now to the drawing, there is shown in FIG. 1 the external, partially cut away configuration of the novel tube apparatus of the present invention. More specifically, a segmented tubular cathode assembly 11 provides a source of electrons which are formed into a pencil-like beam and projected longitudinally of the tube apparatus. A plurality of substantially rectangular cavity resonators, including an input cavity 12, second and third cavities 13 and 14, and an output cavity 15 are centrally apertured to allow the passage of the pencil-like beam of electrons therethrough.

The individual cavity resonators 12–15 are tunable over a wide range via a plurality of novel tuner assemblies 16 which will be more fully described below. The beam, after passing through the output cavity resonator 15, is collected in a collector assembly 17. The thermal energy generated by the impinging electrons within the collector assembly 17 is carried away by an air stream circulated about the collector assembly 17.

R.F. signal energy, which it is desired to amplify, is fed to the input cavity 12 by a vacuum sealed coaxial connector 18. The signal energy velocity modulates the beam as it passes through the input cavity 12. Velocity modulation of the beam is transformed into current density modulation in drift spaces between the input cavity 12 and the first buncher cavity 13. The buncher cavities 13 and 14 further velocity modulate the beam to produce greater current density modulation of the beam at the output cavity 15. The output cavity extracts R.F. energy from the current density modulated beam.

The output R.F. energy is coupled outwardly of the output resonator 15 via a vacuum sealed R.F. coaxial line 19 described in detail below and is fed to a suitable load, not shown, such as, for example, an antenna. A permanent magnet comprising two shell-shaped magnet sections 21 bolted together by bolts **21*a* and clamped onto a pole piece at each end of the tube apparatus, containing the cavity resonators, surrounds the central part of the tube apparatus on two sides and provides a strong axial magnetic field longitudinally of the tube for confining the pencil-like beam of electrons. Each of the magnet sections 21 is provided with a handle 21*b*** for lifting the tube assembly with the magnet attached thereto.

The novel wide range tuner assembly 16 of the present invention is shown in greater detail in FIGS. 3 and 4. More specifically, an inductance plate 22, as of copper, has two thin conductive diaphragms 23 as of 0.015″ thick OFHC copper sheet fixed thereto as by brazing along opposite sides of the plate 22. The other ends of the diaphragms 23 are fixedly secured as by brazing to the cavity end walls 24. The inductance plate 22 is provided with a forwardly projecting block portion 25 midway between the diaphragms 23 whereby when the inductance plate 22 is in its forwardmost position, the forwardly projecting block portion 25 and the folds of the diaphragms 23 substantially form a partition across the cavity resonator which opens up when the inductance plate is moved rearwardly, as shown in FIG. 4*a*.

The inductance plate 22 with its associated diaphragms 23 serves to vary predominately the inductive parameter of the cavity resonator by displacing the magnetic field. Since in the most rearward position of the inductance plate 22 the volume within the folds of the diaphragm 23 is opened up for the magnetic field to penetrate whereas the volume within these folds is effectively closed off with the inductance plate in its forwardmost position, this novel inductive tuner allows a faster rate of change of inductance than does the conventional inductive tuner plate which is completely flat.

A curved capacity plate 26 including two parallel side portions 27 connected in their midportions by a strap 28 is carried upon the extremity of a capacity support arm 29 which in turn is carried from the inductance plate 22. The capacity plate 26 is longitudinally symmetrically disposed with respect to the re-entrant portions of the drift tubes 31 within the cavity resonators with the strap 28 positioned at the gap between the drift tubes 31 and is positioned on the opposite side of the drift tubes 31 from the inductance plate 22. The capacity plate 26 serves to vary predominately the capacitive loading between the mutually opposed and spaced apart re-entrant portions of the drift tubes 17. This capacity plate 26 is curved to conform to the external configuration of the drift tubes 31 thereby to conform to the direction of the magnetic field lines within the cavity to tune the cavity inductively as little as possible and decrease the $R_{sh}/Q$ a minimum amount. At the low frequency end of the tuning range of the tuning assembly when the capacity plate 26 is closest to the drift tubes 31, the particular configuration of the capacity plate prevents the tuning rate due to the capacity plate 26 from increasing rapidly as the capacity plate nears the drift tubes 31. This is so because when the side portions 27 of the capacity plate 26 are close to the drift tubes, most of their movement is substantially parallel to the closest surface thereof, whereas the only portion of the capacity plate 26 moving directly toward drift tubes 31 is the narrow strap 28 connecting the side portions 27. Furthermore, with the strap 28 positioned at the gap between the drift tubes 31, the input and output members of the tube which are located in the cavity wall opposite the tuner assembly are shielded from a direct view of the electron beam, thereby preventing breakdown of the ceramic R.F. seals due to impact of electrons from the electron beam. Since the capacity plate 26 is disposed on the opposite side of the re-entrant portions of the drift tubes 31 from the inductance plate 22, inward movement of the inductance plate 22 serves to decrease the inductance of the cavity and also to decrease the capacitance of the cavity. Conversely, when the inductance plate 22 is moved outwardly of the cavity resonator, both the inductance and the capacitance are increased. Thus, both the inductive and capacitive parameters of the cavity are being simultaneously varied in a complementary way to obtain large tuning effects with relatively small changes in the position of the tuning members.

For actuating the tuner means, an inwardly threaded hollow cylindrical tuner nut 32 is fixedly secured to the backside of the inductance plate 22 by means of an annular flange member 33 brazed to the inductance plate 22 and capturing an outwardly projecting flange on the end of the tuner nut 32. A hollow cylindrical tuner bearing member 34 is constricted at one end to act as a bearing for the outside surface of the tuner nut 32 with the other end of the bearing member extending away from the tuner nut and provided with an outwardly extending flange **34*a* to position the bearing member 34 within the cavity, as described in detail below. A tuner screw 35 is provided with screw threads on one end thereof, which engage the inner threads of the tuner nut 32, and an annular shoulder 36 projecting outwardly from the tuner screw 35 is rotatably captured in an annular recess in the flange 34*a* on the tuner bearing member 34 by a retaining ring 37. An inwardly threaded hollow cylindrical tuner stop 38 slidably fits within the tuner bearing member 34, is screwed onto the free end of the tuner nut 32, and is locked in place by a set screw 39. Rotation of the tuner screw 35 provides longitudinal movement to the tuner nut 32 held within the bearing end of the tuner bearing member 34, the forward longitudinal movement being limited by the tuner stop 38 and the rearward movement being limited by the annular flange member 33 on the back of the inductance plate 22**.

As an indication of the position of the tuner within the cavity, a tuner indicating means passes axially through the tuner nut 32 and the tuner screw 35. This tuner indicating means includes a threaded rod 40 positioned within a bore through the tuner screw 35 and screwed into a plate 41 positioned within the end of the tuner nut 32 adjacent the back of the inductance plate 22. A tuner indicator 42 provided with indicator rings 43 along the external length thereof is screwed onto the other end of the rod 40 and is fixedly held in place by a set screw 44 screwed therewithin and abutting the end of the rod 40. As the tuner is moved within the cavity, the length of the tuner indicator 42 projecting outside of the tuner screw 35 is changed and the position of the tuner is thereby indicated by the indicator rings 43.

A U-shaped cavity sidewall member 45 as of copper, is fixedly secured between the two end walls 24 of each cavity as by brazing, and provides three of the sidewalls of the cavity. The fourth sidewall member 46 as of copper, is provided with an aperture therethrough for passage of the tuner assembly 16 and is fixedly secured as by brazing to the end walls 24 and the ends of the sidewall 45. A ring 47 as of Monel is vacuum sealed as by brazing within the aperture in the fourth sidewall 46 for mounting the tuning assembly and maintaining the vacuum seal.

The tuner bearing member 34 slidably fits within the ring 47 and is bolted thereto by means of a plurality of cap screws 48 which pass through the retaining ring 37, through the flange **34*a* on the end of the tuner bearing member 34 and into tapped holes circularly spaced about the ring 47. A plurality of set screws 49 are threaded into tapped holes circularly spaced about the flange 34*a* and bear up against the ring 47. By proper adjustment of these set screws 49**, the entire tuner assembly can be positioned within the cavity so that the tuner members are properly spaced from the cavity walls and the tuner means is properly positioned to cover the desired tuning range.

A flexible metallic bellows 51 as of stainless steel is fixedly secured in a vacuum tight manner at one end thereof to the outside periphery of the ring 47 within the cavity and at the other end thereof to the outside periphery of the annular flange member 33 on the inductance plate 22. The bellows 51 serve as a flexible vacuum seal for sealing the tuner actuating mechanism from the tuning elements disposed within the cavity resonator thereby permitting translation of these tuning elements within the cavity without destroying the vaccum integrity thereof.

The cavity resonators 12, 13, 14 and 15 are successively arranged along the beam path for successive electromagnetic interaction with the beam of electrons passable therethrough. The separate cavity resonators are sealed together in a vacuum tight manner via a heliarc weld at the periphery of the end plates 24 of adjacent cavity resonators.

An output coupling loop is formed by a strap 52 as of copper vacuum sealing the end of the hollow center conductor 53 of the output coaxial line 19 and connecting this center conductor 53 to the outer conductor 54. Near its external end the outer surface of the outer conductor 54 is provided with a shoulder which engages a cooperating shoulder on a hollow cylindrical member 55 as of copper which surrounds the outer conductor and is vacuum sealed within an output port 56 in the output cavity 15. The external ends of the outer conductor 54 and the cylindrical member 55 are vacuum sealed together as by brazing.

An annular wave permeable window member 57 of ceramic as, for example, alumina is coaxially disposed with respect to the inner and outer conductors 53 and 54 and vacuum sealing the space therebetween as by brazing. The thickness and position of the window 57 are selected to present a predetermined discontinuity in the transmission line and the desired discontinuity can easily be achieved by the use of alumina ceramic which has low loss and a higher dielectric constant on the order of 9 as compared with a dielectric constant of about 3 to 6 for glass previously used for wave permeable windows.

Thus, the ceramic window 57 serves to form the vacuum seal for the R.F. output as well as a frequency sensitive impedance transformer which transforms the load impedance to the optimum impedance for the tube at all frequencies of operation.

This novel window requires no adjustment over the range of the tube, as frequently required in the past, or the necessity for matched window as previously used in combination with a loading member.

A hollow cylindrical output coupling flange 59 for bolting the coaxial line 19 to a standard 1⅝" coaxial line 59 by means of a bullet type adaptor assembly 60 surrounds the cylindrical member 55 and is fixedly secured thereto by cap screws on a split ring member 61 which fits within an annular recess in the outside surface of the cylindrical member 55. An outer conductor extension 62 slidably fits within the external end of the outer conductor 54, seats against a shoulder on the inside surface of the outer conductor 55 and bears against the outer conductor of the coaxial line 59. In this manner nothing bears against the vacuum sealed joint between the outer conductor 54 and the cylindrical member 55 so that the force of shocking blows is not directed against this seal.

The collector assembly 17 serves to collect the electron beam after it passes through the output cavity 15. In the collector assembly 17, a collector pole piece 63 as of steel is secured to the end wall of the output cavity 15 in a vacuum tight manner by means of annular flanges **63*a* secured together by means of a heliarc weld. A hollow cylindrical collector 64 as of steel is secured at one end thereof to the pole piece 63 and near the other end to a circular plug member 65 as of copper provided with a circular groove on either side thereof, these grooves being radially spaced from one another to allow for differential expansion between the collector 64 and the plug member 65. A circular plate 66 as of steel covers the ends of the collector 64. The steel collector minimizes the magnetic field within the collector to prevent focusing of secondary electrons back into the resonator section of the tube apparatus. A plurality of radially extending fins 64*a* fixedly secured to the collector 64** substantially over the length thereof provide means for dissipating the collector heat by means of an air stream.

Since many changes can be made in the above construction and many apparently widely different embodiments of this invention could be made without departing from the scope thereof, it is intended all matter contained in the above description or shown in the accompanying drawings shall be interpreted as illustrative and not in a limiting sense.

What is claimed is:

1. A tuner mechanism for accurately adjusting the position of a tuning member within a cavity comprising an inwardly threaded hollow cylindrical tuner nut connected at one end to the tuning member; a hollow cylindrical tuner bearing member constricted at one end to act as a bearing for the outside surface of said tuner nut, the other end of said bearing member extending away from said tuner nut and adjustably attached to the cavity; a tuner screw adapted to engage the inner threads of said tuner nut and to impart longitudinal movement to said tuner nut and thus to said tuner member, and tuner stop means secured to the end of said tuner nut within said tuner bearing member the outside diameter of said tuner stop means being greater than the inside diameter of said constricted portion of said bearing member whereby longitudinal movement of said tuner nut is limited to a particular distance, inward movement of tuner member being limited when said tuner bearing constricted portion contacts said tuner stop means and outward movement of said tuner member being limited when said tuner bearing member contacts the back of said tuner member whereby the length of the tuner movement can be adjusted by the position of said tuner stop means and the position of said tuner means at the end of its travel can be adjusted by adjusting the position of said bearing member with respect to said cavity.

2. An electron discharge device including means for forming an electron beam; means for collecting the electron beam; cavity resonator means disposed between the means for forming the electron beam and the means for collecting the electron beam; means for tuning said cavity resonator means; and output coupling means for coupling the R.F. energy from said cavity resonator means to a load; said cavity resonator means including a plurality of axially aligned cavity resonators adapted for electromagnetic interaction with the beam of electrons passable therethrough, each of said cavity resonators including two spaced apart circular end walls provided with an aperture therethrough adapted to pass the beam of electrons, a drift tube projecting inwardly to each of said cavity resonators from each of said spaced apart end walls and positioned within the apertures through said end walls, side wall portions connected to said spaced apart end walls enclosing the remainder of each of said cavity resonators, the end walls of successive cavity resonators being joined together at their periphery in a vacuum tight manner whereby each of the separate cavity resonators is first separately assembled and the desired number of separate cavity resonators successively joined together; said means for tuning said cavity resonator means including a tuner mechanism for accurately adjusting the position of a tuning member within each of said cavity resonators comprising an inwardly threaded hollow cylindrical tuner nut connected at one end to the tuning member; a hollow cylindrical tuner bearing member having a constricted portion at one end to act as a bearing for the outside surface of said tuner nut, the other end of said bearing member extending away from said tuner nut and adjustably attached to the cavity resonator; a tuner screw adapted to engage the inner threads of said tuner nut and to impart longitudinal movement to said tuner nut and thus to said tuner member, and tuner stop means secured to the end of said tuner nut within said tuner bearing member, the outside diameter of said tuner stop means being greater than the inside diameter of said constricted portion of said bearing member whereby longitudinal movement of said tuner nut is limited to a particular distance, inward movement of tuner member being limited when said tuner bearing constricted portion contacts said tuner stop means and outward movement of said tuner member being limited when said tuner bearing member contacts the back of said tuner member whereby the length of the tuner movement can be adjusted by the position of said tuner stop means and the position of said tuner means at the end of its travel can be adjusted by adjusting the position of said bearing member with respect to said cavity resonator.

3. High frequency tube apparatus including a plurality of axially aligned cavity resonators adapted for electromagnetic interaction with a beam of electrons passable therethrough, each of said cavity resonators including two spaced apart circular end walls provided with an aperture therethrough adapted to pass the beam of electrons, a drift tube projecting inwardly to each of said cavity resonators from each of said spaced apart end walls and positioned within the apertures through said end walls, side wall portions connected to said spaced apart end walls enclosing the remainder of each of said cavity resonators, the end walls of successive cavity resonators being joined together at their periphery in a vacuum tight manner whereby each of the separate cavity resonators is first separately assembled and the desired number of separate cavity resonators successively joined together.

4. A high frequency tube apparatus including, means for producing and directing a beam of charged particles over a predetermined path longitudinally of the tube, means for collecting the beam at the terminating end of the beam path, and a plurality of axially aligned cavity resonators disposed along said beam path for producing successive electromagnetic interaction with said beam and for extracting high frequency energy from said beam, each of said cavity resonators including two spaced apart circular end walls provided with an aperture therethrough adapted to pass said beam of electrons, a drift tube projecting inwardly of each of said cavity resonators from each of said spaced apart end walls and positioned within the apertures through said end walls, side wall portions connected to said spaced apart end wall portions enclosing the remainder of each of said cavity resonators, the end walls of successive cavity resonators being joined together at their periphery in a vacuum tight manner whereby each of the separate cavity resonators is first separately assembled and the desired number of separate cavity resonators successively joined together.

References Cited

UNITED STATES PATENTS

| | | | |
|---|---|---|---|
| 2,994,009 | 7/1961 | Schmidt et al. | 315—5.48 |
| 3,016,501 | 1/1962 | Gardner et al. | 315—5.53 X |
| 3,169,206 | 2/1965 | Nelson | 315—5.46 X |

HERMAN KARL SAALBACH, *Primary Examiner.*

S. CHATMON, Jr., *Assistant Examiner.*